United States Patent [19]

Okamoto

[11] 4,444,692

[45] Apr. 24, 1984

[54] PROCESS FOR MAKING HYDROXYL TERMINATED LIQUID POLYMERS

[75] Inventor: Yoshihisa Okamoto, Sagamore Hills, Ohio

[73] Assignee: The B. F. Goodrich Company, Arkon, Ohio

[21] Appl. No.: 264,886

[22] Filed: May 18, 1981

[51] Int. Cl.³ .................. C07C 121/28; C07C 121/38; C07C 67/26; C07C 67/48

[52] U.S. Cl. .................. 260/465.4; 260/465 D; 560/78; 560/79; 560/191; 560/198; 560/199; 560/200

[58] Field of Search ............ 560/200, 199, 78, 79; 260/465.4

[56] References Cited

U.S. PATENT DOCUMENTS

| | | | |
|---|---|---|---|
| 3,285,949 | 11/1966 | Siebert | 260/465.4 |
| 3,360,545 | 12/1967 | Wygant | 560/200 |
| 3,481,973 | 12/1969 | Wygant et al. | 560/200 |
| 3,551,471 | 12/1970 | Siebert | 260/465.4 |
| 3,551,472 | 12/1970 | Siebert | 260/465.4 |
| 3,632,854 | 1/1972 | Randall | 560/200 X |
| 3,712,916 | 1/1973 | Siebert | 560/198 |
| 4,013,710 | 3/1977 | Skillicorn | 260/465.4 X |
| 4,069,242 | 1/1978 | Gargiolo | 560/200 X |
| 4,144,395 | 3/1979 | Murphy et al. | 560/200 |

*Primary Examiner*—Joseph Paul Brust
*Attorney, Agent, or Firm*—George A. Kap

[57] ABSTRACT

Hydroxyl terminated reactive liquid polymers are prepared by reacting ethylene oxide, in presence of an amine catalyst, with a carboxyl terminated reactive liquid polymer serum which contains, in addition to the carboxyl terminated liquid polymer, a solvent, an initiator, other reaction products formed during the reaction, and any unreacted reactants; adding a strong acid to form water-soluble amine salts; water-washing; coagulating; separating; drying; and recovering a shelf stable product.

10 Claims, No Drawings

PROCESS FOR MAKING HYDROXYL TERMINATED LIQUID POLYMERS

BACKGROUND OF THE INVENTION

Hydroxyl terminated reactive liquid polymers can be made in a number of different ways. They can be made from olefinic polymers by initially converting a portion of the olefinic bonds of the polymer to ozonide linkages and then cleaving the ozonide linkages to produce a hydroxyl terminated liquid polymer. Liquid polymers prepared in this fashion do not achieve hydroxyl functionality at each end of the polymer chains and as a result, the final terminal hydroxyl functionality is generally considerably less than 2, on the order of 1.6 to 1.8. For most efficient use of the reactants and best overall properties, it is desirable to have final terminal hydroxyl functionality as close to 2 as possible or greater than 2.

The desired terminal hydroxyl functionality is made more attainable by the use of a process wherein a carboxyl terminated reactive liquid polymer is converted to the corresponding hydroxyl terminated liquid polymer. Terminal functionality of practically 2 can be achieved by this process which is essential if higher polymers are to be produced by the subsequent curing reactions with suitable materials.

The carboxyl terminated liquid polymers for the conversion reaction can be made by the process disclosed in U.S. Pat. No. 3,285,949. Pursuant to this process, a suitable monomer is polymerized in a solvent such as tertiary alkanol and/or acetone in presence of an aliphatic azodicarboxylate initiator such as 4,4'-azobis(4-cyanovaleric acid) radical initiator to form unrefined carboxyl liquid polymer that is washed with water, coagulated, separated by decantation, dried and drummed for storage.

The conversion to the corresponding hydroxyl liquid polymer is made by reacting a carboxyl terminated liquid polymer with a stoichiometric or an excess amount of ethylene oxide, per 100 parts of the carboxyl liquid polymer, in presence of 0.01 to 3 parts of a tertiary amine catalyst. Amount of ethylene oxide is generally 3 to 10 parts per 100 parts of the liquid polymer. The product is then dried by vacuum treatment to remove unreacted catalyst and ethylene oxide and drummed for storage, as disclosed in U.S. Pat. No. 3,712,916.

A process has now been discovered for preparing hydroxyl terminated liquid polymers from corresponding carboxyl terminated liquid polymers that eliminates the steps of coagulating, separating, drying and drumming of carboxyl terminated liquid polymers. Furthermore, impurities originating with ethylene oxide and the amine catalyst can be easily removed by addition of a strong acid and subsequent water washing.

SUMMARY OF THE INVENTION

The inventive process comprises reacting unrefined carboxyl terminated liquid polymer with ethylene oxide to produce unrefined hydroxyl terminated liquid polymer and refining the liquid polymer by water washing, coagulating, separating and drying.

DETAILED DESCRIPTION OF THE INVENTION

The invention described herein relates to a process for reacting carboxyl terminated liquid polymer serum, or unrefined carboxyl terminated liquid polymer, with 3 to 10 parts of ethylene oxide in the presence of 0.01 to 3 parts of a tertiary amine catalyst, per 100 parts of the carboxyl terminated liquid polymer. Generally, stoichiometric or an excess amount of ethylene oxide is used. The serum is defined as the functionally terminated liquid polymer in unrefined condition still in the original reaction medium which can contain a solvent, initiator, other reaction products formed during reaction, and any unreacted reactants. The crude hydroxyl terminated liquid polymer is then refined by the steps of water washing, coagulating, separating and drying. The refined product is drummed for storage.

Carboxyl terminated polymers of butadiene, butadiene-acrylonitrile and alkyl acrylates can be produced, for example, by the process taught in U.S. Pat. No. 3,285,949. Preferably, the desired monomers are placed in a solvent with a low chain transfer potential, preferably tertiary butanol, and/or acetone and a radical initiator, preferably 4,4'-azobis-(4-cyanovaleric acid), is added. Polymerizations are run at 70°–90° C. Product polymer is coagulated with a solvent such as methanol or water, separated by decantation and dried under vacuum. The carboxyl terminated liquid polymers normally have molecular weights in the range of about 400 to 8,000 and viscosities in the range of about 500 to 1,000,000 cps, determined by Brookfield Viscometer type RVT.

The carboxyl terminated liquid polymers can have copolymerized therein at least one other olefinically unsaturated monomer, more preferably at least one other vinylidene monomer (i.e., a monomer containing at least one terminal $CH_2=C<$ group per molecule) in the polymeric backbone. Preferred vinylidene comonomers in the polymeric backbone include (a) dienes containing 4 to 10 carbon atoms such as butadiene-1,3, (b) vinyl nitriles such as acrylonitrile and methacrylonitrile, (c) other acrylates having the formula

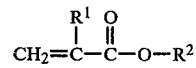

wherein $R^1$ is hydrogen or an alkyl radical containing 1 to 3 carbon atoms and $R^2$ is hydrogen or an alkyl radical containing 1, 2 or 11 to 18 carbon atoms, or an alkoxyalkyl, alkylthioalkyl, or cyanoalkyl radical containing 2 to 12 carbon atoms, preferably 2 to 8. Alternately, $R^1$ can be an alkyl group of 1 to 3 carbon atoms and $R^2$ an alkyl group of 3 to 10 carbon atoms.

Other suitable vinylidene comonomers include (d) vinyl aromatics such as styrene, methyl styrene, and the like; (e) vinyl and allyl esters of carboxylic acids containing 2 to 8 carbon atoms such as vinyl acetate, (f) vinyl and allyl ethers of alkyl radicals containing 1 to 8 carbon atoms such as vinyl methyl ether, allyl methyl ether, and the like; and (g) monoolefins containing 2 to 14 carbon atoms, more preferably 2 to 8 carbon atoms, such as ethylene and propylene.

Examples of liquid carboxyl terminated polymers are carboxyl terminated polyethylene, polybutadiene, polyisoprene, poly(butadiene-acrylonitrile), poly(butadiene-styrene), poly(butadiene-acrylonitrile-acrylic acid), poly(ethyl acrylate), poly(ethyl acrylate-n-butyl acrylate), poly(n-butyl acrylate-acrylonitrile), poly(butyl acrylate-styrene), and the like.

The reaction medium can be any solvent that will dissolve the carboxyl terminated liquid polymer and the hydroxyl terminated liquid polymer that is formed. Acetone, tertiary butanol, methyl ethyl ketone, cyclohexanone, cyclohexanol, tetrahydrofuran, and dioxane are typical solvents that can be used. Optionally, the reaction can be carried out in a mass or a bulk system with no solvent being employed. In such instances, ethylene oxide can be used in excess to insure fluidity and accomplish satisfactory heat transfer.

When a liquid carboxyl terminated polymer is reacted with ethylene oxide, the oxirane ring of ethylene oxide is opened up by reaction with terminal carboxyl groups on a chain to form terminal hydroxyl groups. Pendant carboxyl groups, if present, can likewise be reacted with ethylene oxide.

The hydroxyl terminated liquid polymers produced include polybutadiene, copolymers of butadiene containing in excess of 50% by weight of butadiene with remainder being at least one copolymerizable olefinically unsaturated monomer, such as acrylonitrile, and polyalkyl acrylates containing polymerized in excess of 65% by weight, preferably in excess of 85%, of at least one alkyl acrylate of 3 to 10, preferably 3 to 8 carbon atoms. The polymeric backbone of a hydroxyl terminated liquid polymer can have copolymerized therein at least one other olefinically unsaturated monomer, preferably a vinylidene monomer, already described in connection with carboxyl terminated liquid polymer reactants. Molecular weight, viscosity and other similar properties of the hydroxyl terminated liquid polymers will generally be the same as the carboxyl terminated liquid polymers from which the hydroxyl liquid polymers are made, however, in a preferred embodiment, molecular weight of the hydroxyl terminated liquid polymers is in the range of 1500 to 4000.

This process is made possible by the fact that an epoxide will react with a carboxylic acid much faster than it will with alcohol or water under certain conditions. It is, therefore, possible to manufacture hydroxyl terminated liquid polymers by reacting ethylene oxide with carboxyl terminated liquid polymer serum.

A number of significant advantages are realized by this process when compared to the prior art process. These include elimination of some of the post polymerization process steps, reduction in labor costs since the reaction can be carried out in one reactor, and carrying out the reaction in a low viscosity medium which facilitates handling, charging and agitation. Another even more significant advantage resides in the fact that a cleaner product is obtained. In the prior art process, impurities originating from ethylene oxide or the amine catalyst were difficult to remove by vacuum treatment. In the process disclosed herein, however, water washing and coagulating operations immediately follow the reaction between a carboxyl terminated liquid polymer and ethylene oxide. Thus, the impurities, such as ethylene glycol, can be removed readily.

Removal of the amine catalyst is especially important for promoting shelf stability of hydroxyl terminated liquid polymers. Elimination of the amine catalyst by vacuum treatment is very difficult due to formation of an amine salt with the residual carboxylic acid. In this process, the amine catalyst can be readily removed by adding equal or excess amounts of a strong organic or inorganic acid to the serum after reaction between a carboxyl terminated liquid polymer and ethylene oxide. Ionization constant of the strong acid should be higher than that of 4,4'-azobis-(4-cyanovaleric acid), preferably in the range of about $1 \times 10^{-3}$ to $1 \times 10^{-1}$. Examples of suitable strong acids include phosphoric, sulfuric, hydrochloric, pyrophosphoric, sulfurous, and trichloroacetic acids. The strong acid forms water soluble amine salts instead of the amine salts with a carboxylic acid, that are sparingly soluble in water. Thus, the water soluble amine salts can be easily removed during the water washing step.

Shelf stability of hydroxyl terminated liquid polymers prepared by the process described herein is vastly superior to shelf stability of the corresponding liquid polymers prepared by the prior art process. Whereas viscosity of hydroxyl terminated liquid polymers prepared conventionally deteriorates in 1 to 2 months of storage at 60° C., the liquid polymers prepared pursuant to the process described herein can show less than 10% increase in viscosity at accelerated aging conditions of 60° C. for one month. An example of how badly can viscosity deteriorate of conventionally prepared liquid polymer is a hydroxyl terminated butadiene liquid polymer that had original viscosity at 60° C. of 4880 cps that increased to 25,476 cps on standing for 30 days at 60° C. Since hydroxyl terminated liquid polymers prepared as described herein have less heat history, this would contribute to a lower product viscosity which should lead to a more shelf stable product.

A number of experiments are presented below to demonstrate the herein-claimed invention in greater detail.

EXAMPLE 1

This example demonstrates preparation of a carboxyl terminated poly(butadiene-acrylonitrile) reactive liquid polymer containing 25% acrylonitrile.

Polymerization of 76 parts by weight of butadiene and 24 parts of acrylonitrile was carried out at 85° C. for 18 hours in 100 parts by weight acetone in presence of 13 parts by weight of 4,4'-azobis-(4-cyanovaleric acid). A portion of acrylonitrile and the radical initiator was added incrementally. After completing the polymerization reaction, excess butadiene was vented and about an equal amount of water, i.e. 200 parts, was added with stirring to coagulate the liquid polymer. After settling, the water-acetone layer was decanted and the polymer was then dried in an evaporator to constant weight. The resulting carboxyl terminated liquid polymer had Brookfield viscosity of 324,000 cps at 27° C., and COOH/ephr of 0.065. The contraction ephr stands for equivalents per 100 parts of rubber.

EXAMPLE 2

This example demonstrates preparation of hydroxyl terminated liquid polymer by the prior art procedure.

The liquid polymer used in this experiment was carboxyl terminated poly(butadiene-acrylonitrile) containing 25% acrylonitrile, with a viscosity of 324,000 cps at 27° C., and ephr of 0.065, as defined in Example 1, above.

200 grams or 0.130 equivalent of the carboxyl terminated liquid polymer was reacted with 9.75 milliliters or 0.195 equivalent of ethylene oxide in presence of 500 ppm trimethylamine catalyst. The reaction was carried out at 90° C. for 7 hours until residual acid of 0.005 ephr was reached.

EXAMPLE 3

This example demonstrates preparation of a hydroxyl terminated liquid polymer by the process disclosed herein.

Serum for this experiment was obtained by polymerizing butadiene and acrylonitrile, as described in Example 1, through the step of venting unreacted butadiene but prior to the coagulating step. 250 grams of the serum containing 0.173 equivalent of carboxyl terminated poly(butadiene-acrylonitrile) liquid polymer of Example 1, above, was reacted with 10.7 milliliters or 0.214 equivalent of ethylene oxide in presence of 3000 ppm of trimethylamine catalyst as a 25% aqueous solution. Temperature of the reaction was 90° to 95° C. and its duration was 11 hours. Progress of the reaction was monitored by measuring the acid content. The reaction was completed when acid content of about 0.002 ephr was reached following which, the hydroxyl terminated liquid polymer serum was treated by an identical procedure used for refining carboxyl terminated liquid polymers. This procedure involved coagulation, washing with 200 ml of water, separation, and drying at 130° C. in vacuum. The physical properties of hydroxyl terminated liquid polymers prepared by the prior art process and the new process described herein are nearly identical, as is apparent from the table below.

TABLE A

|  | Prior Art Process | New Process |
|---|---|---|
| Viscosity @ 27° C., cps | 242,000 | 190,000 |
| OH Number | 34.5 | 38.4 |
| Residual Acid, ephr | 0.005 | 0.003 |

Gel permeation chromatography further corroborated that nearly identical hydroxyl terminated liquid polymers were obtained by the prior art process and the new process described herein. The GPC results are given in the table below in terms of polystyrene.

TABLE B

|  | Prior Art Process | New Process |
|---|---|---|
| Mn | 7030 | 7260 |
| Mw | 14,700 | 16,400 |
| Mw/Mn | 2.10 | 2.26 |
| Peak | 8930 | 10,300 |

Accelerated aging tests were conducted at 60° C. on the hydroxyl terminated liquid polymer prepared in this example pursuant to the process described herein. Initial viscosity thereof was 273,000 cps measured at 27° C. which increased to 290,000 cps after two weeks and to 300,000 cps after one month at 60° C. Viscosity of hydroxyl terminated liquid polymers prepared by the prior art procedure had initial viscosity of 277,000 cps that increased to 290,000 cps after two weeks and to 307,000 cps after one month at 60° C. The relatively slight viscosity increase from 277,000 cps to 307,000 cps was unexpected since hydroxyl terminated liquid polymers prepared by the prior art process normally suffer unacceptable viscosity increase on storage. For instance, a hydroxyl terminated polybutadiene liquid polymer prepared in a conventional way had original viscosity of 36,000 cps at 27° C. that increased to 62,400 cps at 27° C. after aging for 30 months at ambient conditions. The relatively slight increase in viscosity of the hydroxyl terminated reactive liquid polymer, noted above, is probably due to more efficient and longer drying, and higher vacuum when compared to such liquid polymers prepared in the plant.

I claim:

1. Process for preparing a hydroxyl terminated reactive liquid polymer product comprising reacting undried and unrefined carboxyl terminated liquid polymer with a sufficient amount of ethylene oxide in the presence of a tertiary amine catalyst to convert the carboxyl liquid polymer to the hydroxyl terminated liquid polymer, followed by refining the hydroxyl terminated liquid polymer, wherein the said carboxyl terminated liquid polymer is selected from the group consisting of carboxyl terminated polyethylene, polybutadiene, polyisoprene, poly(butadiene-acrylonitrile), poly(butadiene-styrene), poly(butadiene-acrylonitrile-acrylic acid), poly(ethyl acrylate), poly(ethyl acrylate-n-butyl acrylate), poly(n-butyl acrylate-acrylonitrile), and poly(butyl acrylate-styrene), said product showing less than 10% increase in viscosity when kept at 60° C. for one month and wherein said carboxy terminated liquid polymer has a molecular weight in the range of about 400 to 8,000 and a viscosity in the range of about 500 to 1,000,000 cps.

2. Process of claim 1 wherein the amount of ethylene oxide added is 3 to 10 parts by weight and the amount of the catalyst added is 0.01 to 3 parts by weight, per 100 parts by weight of the carboxyl liquid polymer.

3. Process of claim 2 wherein the unrefined carboxyl terminated liquid polymer comprises the carboxyl liquid polymer in unrefined condition in the original reaction medium which also contains a solvent, an initiator, other reaction products formed during the formation of the carboxyl liquid polymer by polymerization of the monomers in the presence of an aliphatic azodicarboxylate initiator, and any unreacted reactants.

4. Process of claim 3 that further includes the steps of water-washing the hydroxyl liquid polymer, coagulating, separating, and drying the same.

5. Process of claim 4 that further includes the step of adding a strong organic or inorganic acid after formation of the hydroxyl liquid polymer but before the water-washing step to facilitate removal of impurities.

6. Process of claim 5 wherein the strong acid has an ionization constant in the range of $1 \times 10^{-3}$ to $1 \times 10^{-1}$ and the acid forms water soluble salts with the amine catalyst.

7. Process of claim 6 wherein the carboxyl liquid polymer is selected from carboxyl terminated polybutadiene and carboxyl terminated poly(butadiene-acrylonitrile).

8. Process of claim 6 wherein the carboxy terminated liquid polymer is selected from the group consisting of carboxy terminated polybutadiene and carboxy terminated poly(butadiene-acrylonitrile) containing in excess of 50% butadiene.

9. Hydroxyl terminated reactive liquid polymers made by the process of claim 1.

10. Hydroxyl terminated reactive liquid polymers that show less than 10% increase in viscosity when kept at 60° C. for one month made by the process of claim 7.

* * * * *